May 30, 1961   C. J. MANGIARACINA   2,986,317
RAPID FILM ACCELERATION DEVICE
Filed Oct. 24, 1958   2 Sheets-Sheet 1
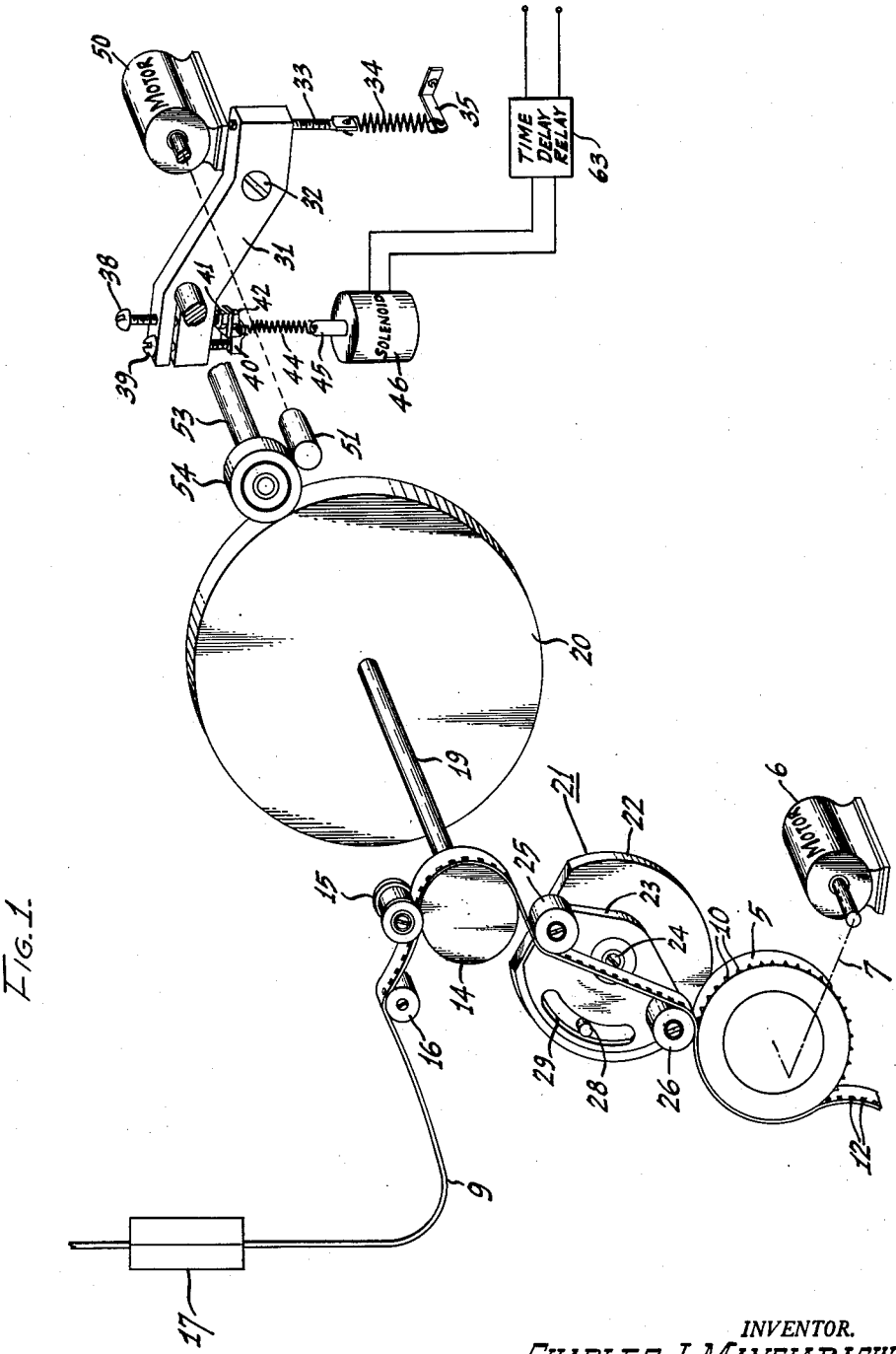
INVENTOR.
CHARLES J. MANGIARACINA
BY
ATTORNEY

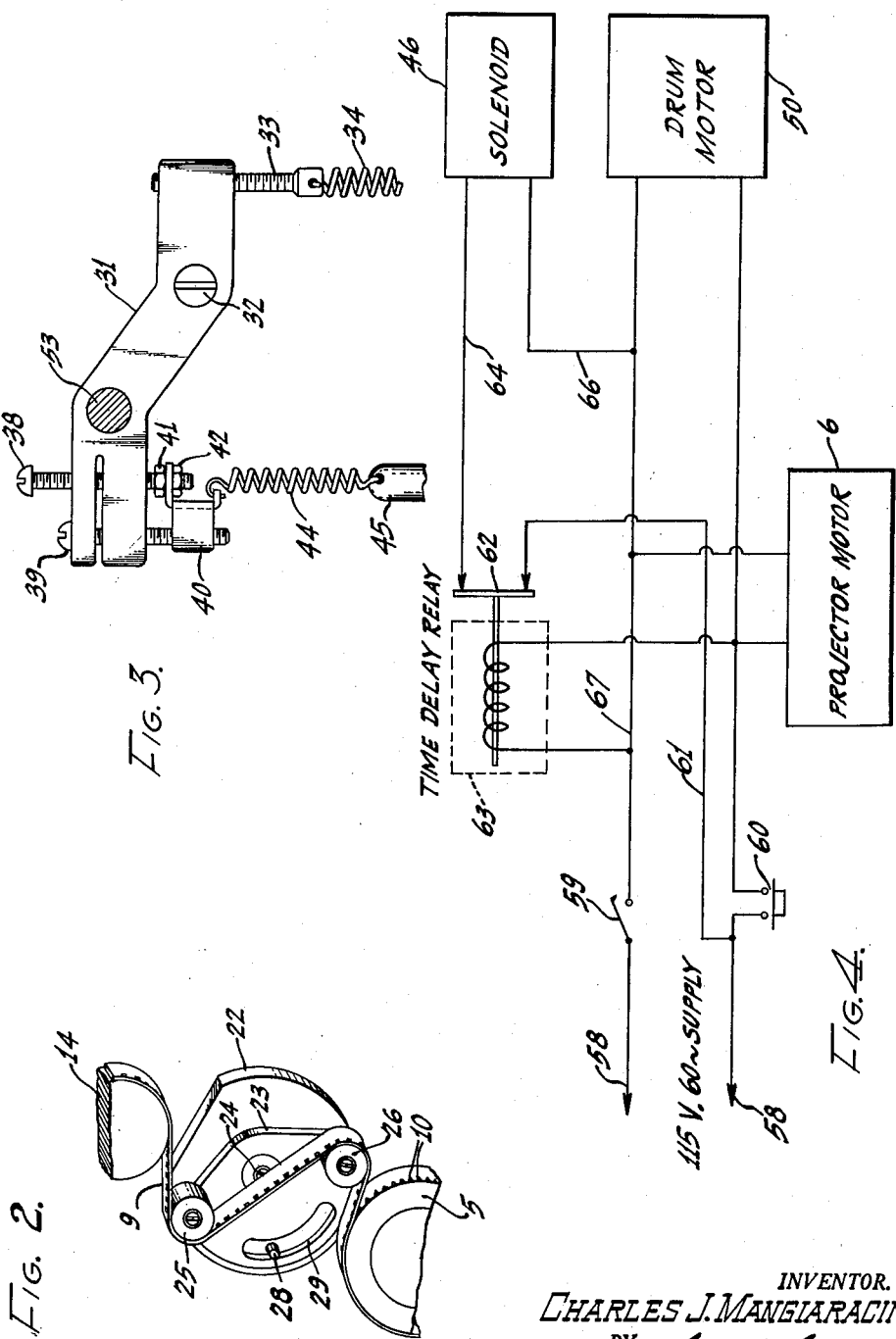

ent Office 2,986,317
Patented May 30, 1961

2,986,317

RAPID FILM ACCELERATION DEVICE

Charles J. Mangiaracina, Haddonfield, N.J., assignor to Radio Corporation of America, a corporation of Delaware Filed Oct. 24, 1958, Ser. No. 769,433

10 Claims. (Cl. 226—61)

This invention relates to sound reproducing equipment, and particularly to an automatic starting unit or adjunct for film transport mechanisms of sound motion picture projectors.

To obtain stabilization, sound reproducers, particularly sound motion picture projectors, use a film-pulled drum on the shaft of which is mounted a flywheel. The drum and flywheel are rotated by the pull of the film passing over the drum. The film sprockets, however, are directly connected to the projector motor, and because of the flywheel mass, the sprockets come up to speed before the stabilizing drum. The present invention is an adjunct for positively driving the stabilizing drum and flywheel by an auxiliary motor so that it will reach operating speed at practically the same time as the sprockets, thereby minimizing the time required to stabilize the picture and sound.

Various devices have been suggested and used for accelerating the flywheel, clutch mechanisms being disclosed in Black Patent No. 2,106,338 and Pettus Patent No. 2,702,705, a magnetic clutch device with a timer unit being disclosed in Collins Patent No. 2,233,284, and a solenoid-operated booster being disclosed in Hoehn Patent No. 2,743,922, the latter also disclosing the general film transport system of the present invention.

The present invention is an improvement over these prior systems by utilizing a separate flywheel motor which is connected to and disconnected from the flywheel to provide a positive acceleration during the acceleration of the sprockets by the projector motor and a positive braking action when the power to the flywheel and projection motors is removed. In the present invention, the stabilizing drum is driven at a greater acceleration compared to that of the sprockets, a spring-loaded filter between the sprocket pulling the film over the drum and the drum taking up the loop until the film is up to speed. In this manner, a very rapid start of the projector may be obtained, which is desirable in television broadcasting to eliminate the long "roll cue." This permits the film to get "on the air" in the minimum time.

The principal object of the invention, therefore, is to reduce the time required for stabilizing a sound film or motion picture sound film.

Another object of the invention is to provide an improved unit or adjunct to sound motion picture projectors for bringing a film-pulled drum and flywheel up to speed along with the film accelerated by the sprockets.

A further object of the invention is to provide a combination accelerating and braking unit for a film-pulled drum and flywheel of sound motion picture projectors.

A better understanding of this invention may be had from the following detailed description when read in connection with the accompanying drawings, in which:

Fig. 1 is a diagrammatic perspective view showing the invention in combination with a sound motion picture film transport mechanism.

Fig. 2 is a perspective view of the spring-loaded filter action during acceleration of the film.

Fig. 3 is an elevational view of the adjusting mechanism which will compensate for variations in different sound motion picture machines; and Fig. 4 is a schematic circuit diagram showing the starting circuit of the invention.

Referring, now, to the drawings in which the same reference numerals indicate the same elements, a film sprocket 5 is driven by motor 6 as shown diagrammatically by a broken line 7. The sprocket 5 advances the film 9 as its teeth 10 enter the film perforations 12. To stabilize the film speed, the film rotates a drum 14 on which the film is held by a pressure roller 15 and to which it is guided by a guide roller 16. To indicate a projector, a film gate through which the film is advanced intermittently is shown diagrammatically at 17.

The drum 14 is mounted on a rotatable shaft 19 on which is mounted a flywheel 20 to provide the proper damping and stabilization of the film 9 when a constant speed is reached. Between the sprocket 5 and drum 14 is a spring-loaded, damped filter unit 21 consisting of a mounting plate 22 on which a semi-circular disc 23 is pivoted at 24, the disc 23 having mounted thereon idler rollers 25 and 26. To the plate 22 is attached a pin 28 extending through an arcuate slot 29 of the disc 23, this pin and slot combination limiting the rotation of the disc 23. The positions of the idler rollers 25 and 26 shown in Fig. 1 are their normal positions after uniform film speed has been reached. The details of this unit are disclosed and claimed in Bartleson U.S. Patent No. 2,685,417 of August 3, 1954. This type of film drive is well known in the art, it being understood that, to bring the drum 14 and flywheel 20 up to the speed of the film passing thereover, not only is considerable stress placed on the film 9, but considerable time is required to bring the large flywheel mass up to speed. To quickly accelerate the flywheel, the unit or adjunct now to be described has been provided.

Again referring to Fig. 1 and also to Fig. 3, a bracket 31 is pivoted at 32, the pivot being mounted on the projector frame. At one end of the bracket is a screw 33 having one end connected to one end of a spring 34, the other end of the spring being attached to a bracket 35 also anchored to the frame of the projector. The other end of the bracket 31, which is split, has threaded through it screws 38 and 39. The screw 39 provides a guide for a U portion of bracket 40, having one end between nuts 41 and 42 on the screw 38. The other end of the U portion of bracket 40 has a spring 44 connected thereto, which, in turn, has its other end connected to an armature 45 of a solenoid 46.

Referring, now, to Fig. 1, a motor 50, suitably mounted on the projector frame, drives a shaft 51. A fan may be mounted on the other side of motor 50 for cooling the exciter lamp of the projector. Attached to the split end of bracket 31 is a shaft 53 on which a puck 54 is rotatable. The position of the puck is controlled by the energization of a solenoid 46 so that, when the solenoid is energized, the puck is brought in contact with the perimeter of the flywheel 20 and the shaft 51 so that rotation of the shaft 51 will drive the flywheel 20 through the puck 54. When the solenoid 46 is de-energized, the puck will be raised by the spring 34 and motor power will be removed from the flywheel.

In the circuit shown in Fig. 4, a normal power source, such as a 115-volt 60-cycle alternating current source, is connectable to terminals 58 which are connected to a circuit breaker 59 and a start and stop switch 60. When the circuit breaker is closed, power is connected over conductors 61, swinger 62 of a time delay relay 63, and conductor 64 to solenoid 46, the other side of the circuit being over conductor 66 and conductor 67. The solenoid is thus actuated, which will move the puck 54 in contact with the perimeter of flywheel 20 and the shaft 51. To start the machine, the switch 60 is actuated, which energizes time delay relay 63, projector motor 6 and the drum motor 50. Thus, both motors are energized and the flywheel and sprockets are rapidly brought to speed. The puck 54 is maintained in contact with the flywheel 20 and shaft 51 since solenoid 46 remains energized while the projector motor 6 brings the film sprockets up to speed and the motor 50 brings the flywheel and drum up to speed.

Since the drum 14 reaches normal running speed before the sprocket, a loose loop would normally be formed between the drum 14 and the sprocket 5. However, the spring bias filter unit 21 will take up the loop by adjusting itself to the position shown in Fig. 2. The time delay relay 63 is set to break the solenoid energizing circuit at swinger 62 as soon as the film is up to speed. This will remove the puck from the flywheel and drive shaft of motor 50 and the filter unit 21 will remain in its normal operating position shown in Fig. 1.

When the projector is turned off at any time while there is still film therein, the two motors are de-energized. Also, time delay relay 63 is de-energized, which will energize the solenoid 46 over the first circuit breaker circuit traced above. The puck is thus brought in contact with the flywheel 20 and shaft 51, and the motor 50 will brake the flywheel and decrease its speed at the faster rate as the speed of the sprocket 5 is decreased by motor 6.

The above flywheel accelerator provides both a positive acceleration action and a positive braking action which prevents damage to the film and minimizes the time required to stabilize both the picture and sound portions of the projector. This is particularly desirable in television broadcast film sound picture projectors where it is desirable to get picture and sound "on the air" as rapidly as possible.

I claim:

1. An accelerator device for a flywheel comprising a solenoid, an armature for said solenoid, a motor having a shaft driven thereby, a pivoted bracket having a shaft extending from one end thereof, a puck mounted on one end of said last named shaft, movement of said bracket in one direction moving said puck in contact with said flywheel and said motor shaft, and means interconnecting said bracket and said armature for moving said bracket in said one direction upon energization of said solenoid and before said motor is energized to thereby move said puck into contact with said flywheel and said motor shaft.

2. An accelerator device in accordance with claim 1 in which means are provided for moving said bracket in a direction opposite to said one direction when said solenoid is de-energized and while said motor remains energized, said first named means being adapted to move said puck into contact with said flywheel and said motor shaft when said motor is de-energized, and said motor then being adapted to brake said flywheel.

3. In a film drive system having a toothed sprocket driven by a motor for advancing film over a film-pulled drum having a flywheel connected thereto, the combination of a power supply for said toothed sprocket motor, a second motor having a shaft driven thereby and connectable to said power supply, a solenoid connectable to said power supply, means for interconnecting said shaft of said second motor with said flywheel upon energization of said solenoid, circuit means for energizing said solenoid before the energization of said motors, and means for de-energizing said solenoid a predetermined time after said motors are connected to said power supply, said circuit means being adapted to re-energize said solenoid upon de-energization of said motors.

4. A film drive system in accordance with claim 3 in which said interconnecting means between said second motor shaft and said flywheel includes a pivoted bracket, a shaft mounted on said bracket, a rotatable puck on said shaft, and means interconnecting said bracket and said solenoid, said interconnecting means including adjusting means for controlling the pressure of said puck on said motor shaft and said flywheel.

5. A film drive system in accordance with claim 4 in which resilient means are provided for disconnecting said shaft of said second motor from said flywheel when said solenoid is de-energized.

6. A film speed acceleration transport system comprising a toothed sprocket adapted to advance perforated film thereover, a first motor for accelerating said sprocket, a drum adapted to have film pulled thereover by said sprocket, a shaft for said drum, a flywheel mounted on said shaft, a second motor, mechanical means for connecting and disconnecting said second motor to and from said flywheel for accelerating said flywheel and drum, and circuit means for controlling said connecting and disconnecting means, said circuit means being adapted to actuate said mechanical means prior to the energization of said motors, inactivate said mechanical means after energization of said motors, and reactuate said mechanical means upon de-energization of said motors.

7. A film speed acceleration transport system in accordance with claim 6 in which said mechanical connecting and disconnecting means includes a puck adapted to contact the perimeter of said flywheel and a solenoid for moving said puck in contact with said flywheel.

8. A film speed acceleration transport system in accordance with claim 6 in which said circuit means includes a time delay relay for de-energizing said solenoid a predetermined time after the energization of said motors.

9. A film speed acceleration transport system in accordance with claim 6 in which said mechanical connecting and disconnecting means includes a puck for contacting said flywheel and the shaft of said motor and a solenoid for actuating said puck, said solenoid being adapted to be energized before said motors are adapted to be energized and after said motors are de-energized.

10. A film speed acceleration transport system in accordance with claim 9 in which a time delay relay is provided for de-energizing said solenoid a predetermined time after said motors are energized and for energizing said solenoid immediately upon de-energization of said motors.

References Cited in the file of this patent

UNITED STATES PATENTS

| | | |
|---|---|---|
| 1,459,358 | Buchenberg | June 19, 1923 |
| 1,802,065 | Poulsen et al. | Apr. 21, 1931 |
| 2,468,855 | Abrahamse et al. | May 3, 1949 |
| 2,539,179 | Bevis et al. | Jan. 23, 1951 |
| 2,743,922 | Hoehn | May 1, 1956 |
| 2,861,459 | Anthon | Nov. 25, 1958 |